United States Patent [19]
Fournol

[11] Patent Number: 5,226,410
[45] Date of Patent: Jul. 13, 1993

[54] PHYSIOLOGICAL SAFETY DEVICE FOR AIRCRAFT PILOTS

[75] Inventor: Daniel Fournol, Paris, France

[73] Assignee: Etat Francais, Paris, France

[21] Appl. No.: 757,175

[22] Filed: Sep. 10, 1991

[30] Foreign Application Priority Data

Sep. 12, 1990 [FR] France .................. 90 11288

[51] Int. Cl.⁵ .................. A62B 17/00; B64D 47/00
[52] U.S. Cl. .................. 128/202.11; 600/19; 600/20; 128/29 R; 128/205.24; 128/29.21
[58] Field of Search .................. 128/202.11, 201.24, 128/204.18, 205.24, 202.19, 202.13, 200.24, 24 R, 204.21; 244/118.5, 121; 600/19, 20

[56] References Cited

U.S. PATENT DOCUMENTS

| | | | |
|---|---|---|---|
| 2,760,484 | 8/1956 | Ferwerda | 600/19 |
| 2,966,155 | 12/1960 | Krupp | 128/202.11 |
| 3,780,723 | 12/1973 | Van Patten | 600/19 |
| 4,370,975 | 2/1983 | Wright | 128/64 |
| 4,546,491 | 10/1985 | Beaussant | 2/2.1 A |
| 4,583,522 | 4/1986 | Aronne | 600/20 |
| 4,638,791 | 1/1987 | Krogh et al. | 600/19 |
| 4,736,731 | 4/1988 | Van Patten | 600/20 |
| 4,881,539 | 11/1989 | Pasternack | 128/201.27 |
| 4,895,320 | 1/1990 | Armstrong | 244/118.5 |
| 4,906,990 | 3/1990 | Robinson | 340/945 |
| 5,072,727 | 12/1991 | Aronne | 128/202.11 |
| 5,121,744 | 6/1992 | Njemanze | 128/202.11 |

FOREIGN PATENT DOCUMENTS

850356 10/1960 United Kingdom ........... 128/202.11
1003401 9/1965 United Kingdom ........... 128/202.11

OTHER PUBLICATIONS

B. R. S. Reddy et al., An Improved Controller for a Pulsating Anti-G Suit, Mar. 12–13, 1987, vol. 1, University of Pennsylvania, Philadelphia, Pa., Proceedings of the Thirteenth Annual Northeast Bioengineering Conference.
Jan., 1991, Interavia Aerospace Review, pp. 57–58.

*Primary Examiner*—Edgar S. Burr
*Assistant Examiner*—Eric P. Raciti
*Attorney, Agent, or Firm*—Oliff & Berridge

[57] ABSTRACT

A device providing physiological protection of aircraft pilots against the effects of altitude and accelerations includes a source of oxygen; a chest jacket fitted with at least one inflation bladder connected to a pressure reducing valve installed on a source of gas under pressure by a pipe; an oxygen mask connected to a source of oxygen by a conduit and a pressure reducing valve. The anti-g trousers include at least one inflation bladder connected to a pressure reducing valve, the bladder being mounted on a source of gas under pressure. The device further includes a mechanism to detect accelerations which delivers a signal representative of the acceleration. The device is characterized by a deformable volume located inside the inflating bladder of the chest jacket connecting the mask to the source of oxygen.

13 Claims, 1 Drawing Sheet

PHYSIOLOGICAL SAFETY DEVICE FOR AIRCRAFT PILOTS

BACKGROUND OF THE INVENTION

The invention relates to equipment providing physiological protection of aircraft pilots against the effects of height and accelerations.

Protection against the effects of height is currently ensured by a source of respirable oxygen connected, through a pressure reducing valve and a conduit, to an oxygen mask applied as hermetically as possible to the face of a pilot.

Protection against the effects of accelerations is ensured by a suit known as anti-g and by an oxygen overpressure applied inside the mask.

Moreover, the operation of these means of protection supposes the presence of a detector of longitudinal acceleration, generally with a runner, compared to the pilot's body, and of a valve known as anti-g located on a source of compressed gas. This source is currently the respirable oxygen reserve.

The anti-g suit comprises a jacket and trousers. These two elements comprise bladders connected to pipings. The piping of the trousers bladders is connected to the anti-g valve, and the piping of the jacket bladders is connected to a valve supplying the respirable oxygen mask.

The operation is as follows. In case of movement of the aircraft causing a longitudinal acceleration directed from the head to the feet of the pilot, the accelerometer with runner causes the progressive opening of the anti-g valve and of the overpressure setting valve of the oxygen mask.

The opening of the anti-g valve causes the inflation of the trousers bladders, thus applying to the pilot's lower limbs a pressure preventing the accumulation of blood in the veins. The opening of the oxygen overpressure valve causes an overpressure to the mask and jacket. The internal respiratory overpressure induced in the mask, and consequently inside the pilot's chest, is compensated by the external overpressure on the pilot's chest induced in the jacket bladders. To avoid lesions, the internal and external pressures must remain equal.

The current equipment has many drawbacks. Since respirable oxygen is used as the agent of inflation, materials compatible with oxygen must be used; these materials age badly, and it is necessary to renew them often. In case of fire, the presence of oxygen in contact with the body of the pilot increase the risk and the seriousness of burns. Further, should the jacket be torn, oxygen is unable to reach the mask.

The efficiency of the jacket supposes an adjustment on the pilot's chest and an oxygen flow able to compensate the variations of volume of the rib cage without any delay. These conditions are poorly realized by the current equipment. The current means of protection, which use respirable oxygen as an agent of inflation, increases the consumption of a resource available in limited quantity in the aircraft, and thus might decrease the duration of missions in high altitude. The decreased duration would become drastic when the trousers or the jacket are torn. In that case, moreover, fire hazards are increased as oxygen is spread through the cabin.

The current means also does not allow a good use of the oxygen laws of dilution according to the acceleration. Indeed, since the jacket is in series with the pilot's mask, its dead volume prevents the oxygen concentration from moving inside the mask simultaneously toward the exit of the regulator. Then, when the aircraft climbs rapidly, the oxygen content inspired in the mixture is insufficient, which is not acceptable for pilot safety.

In addition, in case of failure of the anti-g valve, the respiratory overpressure is not ensured any longer. The moment when the bladders are intended to be inflated for protecting the pilot against accelerations is delayed because of the inertia of the sensor (runner) and equipment (anti-g valve, trousers), thus reducing the efficiency of the pilot protection. The trousers are inflated abruptly and uniformly, which is very uncomfortable for the pilot who feels a punch and responds unsatisfactorily to the laws of balance between the blood pressure generated by the acceleration and the backpressure exerted by the anti-g trousers. In addition, the uniform inflation has an adverse effect on the blood return to the heart.

SUMMARY OF THE INVENTION

The present invention aims at eliminating these drawbacks and, in particular, at supplying an individual with equipment of the type described here-above ensuring a better protection of the pilot against the effects of acceleration and altitude and against some damage possibly occurring in flight. The present invention also aims toward ensuring that the pilot receives respiratory mixtures in conformity with the current laws of dilution.

The invention thus proposes the use of non-flammable gases to ensure trousers and jacket inflation, in order to protect the pilot against the effects of acceleration, while supplying the pilot with respirable gas compatible with the physiological laws of protection against hypoxia, and maintaining permanently an equal pressure inside the jacket and the mask of the pilot in order to avoid pulmonary lesions. Moreover the device according to the invention allows release from the anti-g valve, a reduction in the general consumption of oxygen, free blood return to the heart, and more generally, improved pilot comfort.

For this purpose, the invention relates to a device ensuring the physiological protection of aircraft pilots against the effects of altitude and accelerations, including a source of oxygen; a chest jacket comprising at least an inflation bladder connected to the source of oxygen by a pipe and a pressure reducing valve; anti-g trousers comprising at least one inflation bladder connected to pressure reducing valves, being themselves mounted on a common source or separated from gas under pressure; and, means to detect the accelerations creating a representative signal of acceleration. The device is characterized by a pipe connecting the mask to the source of oxygen which travels through a deformable volume located, at least, inside one inflation bladder of the chest jacket.

The invention also relates to a device ensuring the physiological protection of aircraft pilots against the effects of altitude and accelerations, comprising a source of oxygen; a chest jacket comprising at least one inflation bladder connected by pipings to pressure reducing valves mounted on a source of gas under pressure; an oxygen mask connected to a source of oxygen by a conduit and a pressure reducing valve; anti-g trousers comprising inflation bladders connected to pressure reducing valves, being themselves installed on a source common or separated from the gas under pressure; and, means to detect the accelerations creating a signal representative of the acceleration. The device is characterized by various inflation bladders of the anti-g trousers being connected to pressure reducing valves whose exit pressure values are calculated from a continuous increasing function of the signal representative of the acceleration, and whose derivative decreases proportionally to the distance from the pilot's heart to each bladder inflated by each pressure reducing valve.

According to a preferred embodiment, the exit pressure values of the pressure reducing valves are calculated from a continuous increasing function of the signal representative of the acceleration, and whose derivative is proportional to the distance from the heart of the pilot to each bladder, taking into account the position of the pilot in the aircraft compared to the resultant of the acceleration.

Preferably, the continuous increasing function also takes into account the position of the aircraft ailerons and control surfaces and/or the control surface altitude.

Preferably, the means for detecting the acceleration comprises a sensor transforming the displacements of the aircraft control handle into electric quantity; an integrator transforming this size into a resultant of control; a signal calculator receiving on the one hand the resultant of control, and on the other hand a representative size of the combination of the aircraft speed compared to air, altitude, and the position of the aircraft ailerons and control surfaces; and, elaborating from these two sizes, a signal representative of the resultant of the aircraft acceleration decided by the pilot, according to the longitudinal axis of the pilot's body.

Preferably, each pressure reducing valve is controlled by a control unit delivering a signal representative of the resultant of the acceleration which is then modulated by the generating calculator of the continuous increasing function inside the control unit, so that the opening of the pressure reducing valve is progressive, thus ensuring better pilot comfort.

According to a preferred embodiment, the deformable volume located inside the inflation bladders of the chest jacket comprises a flexible and light fabric o crossed by a connecting pipe having a perforated rigid part located inside the deformable volume of the pressure reducing valve to the mask, preventing the collapse of the deformable volume.

According to another embodiment, the source of compressed gas is achieved by a sampling at the level of one stage of the compressor of one of the aircraft engines.

Preferably, control circuits are used to control the various pressure reducing valves in sequence.

According to the preferred embodiment, a suit is made from a single piece of material, covering all of the parts of the pilot's body except the neck and head.

Other characteristics and advantages of the invention will appear in the non-restrictive detailed description of the embodiments of the invention. This description will be made with reference to the drawing.

BRIEF DESCRIPTION OF THE DRAWING

Referring to the drawing which forms part of the original disclosure.

DETAILED DESCRIPTION OF PREFERRED EMBODIMENTS

Figure 1:
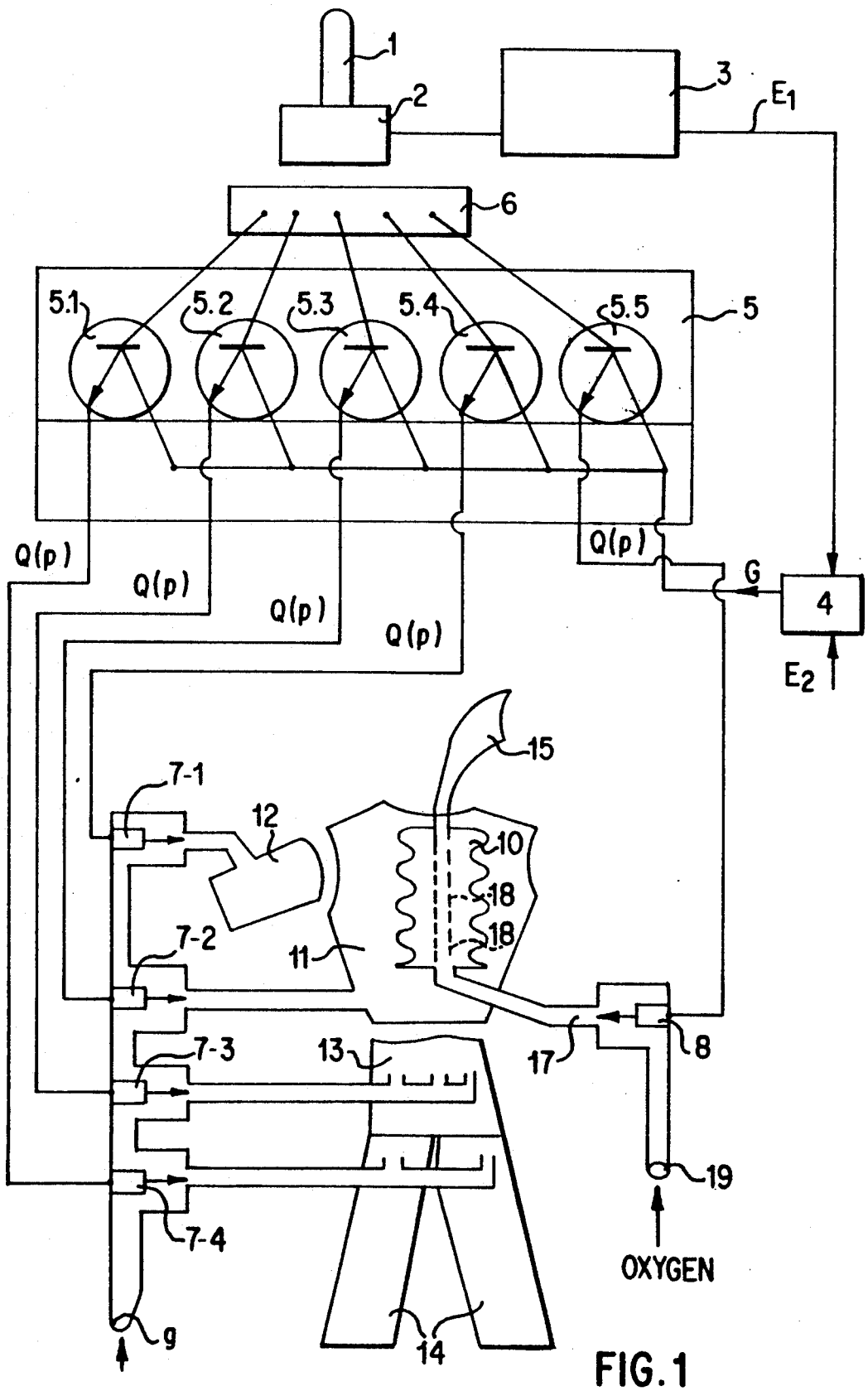
FIG. 1 is a schematic drawing of the components of the device according to the present invention.

FIG. 1 shows, schematically, the control and regulation units which are, for a better comprehension, represented on a scale larger than the protective suit (jacket 20 and trousers 22). The displacements of the control handle 1 of the aircraft are detected by sensors 2 and transformed into electric signals. These signals are integrated and compared to the time in integrator 3.

The output signal E1 of integrator 3 is sent to signal transformer 4 where it is combined with another input signal E2 representative of the combination of the aircraft speed compared to air and altitude and the position of the aircraft ailerons and control surfaces. The output signal G of the generating calculator is then processed in a processing and distributing module 5 which generates a series of n signals, distinct or confused (in figure, n=5), of the form $Q(P) = G * \beta p$ in which $p \leq n$ and sends the signals to function 6. The generator of function 6 modulates the signal G of the signal calculator 4 using a function whose derivative is predetermined according to the various parameters relating to: aircraft speed, altitude, and the position of ailerons and control surfaces. The output signal from function 6 is then distributed by processing and distributing modulus 5, distinct or confused. The generator of function 6 acts to some extent like a divider of the voltage representative of G, which is sent to each pressure reducing valve 7 controlling each bladder.

The sign *, in the above equation, indicates the output signal Q (p) is the resultant of a combination of signal G with function $\beta(p)$ generated by the generator of function 6. $\beta(p)$ is a function specific of the part of the body on which an external pressure has to be exerted through a bladder which takes into account on the one hand the position of the bladder compared to the heart when the pilot is operating the controls and, on the other hand, the laws of the pressures inherent to each bladder.

The signal Q (p) is used to control the electric or pneumatic opening of pressure reducing valves 7, mounted on an arrival of constraint gas. This arrival can be one of the states of compression of one of the aircraft engines. Each pressure reducing valve ensures the inflation of one bladder, or of a group of bladders, to the pressure required for the considered bladder and the comfort of the pilot. In FIG. 1, four bladders or groups of bladders are represented, specifically, a group of two bladders 14 located on each trousers leg in connection with pressure reducing valve 7-4; bladder 13, located at the level of the belly connected to pressure reducing valve 7-3; and bladder 12 located at the level of the arm connected to pressure reducing valve 7-1. A pressure reducing valve 7-2 is connected to bladder 11 located at the level of the pilot thorax. In the case of the embodiment represented in FIG. 1, there are only four pressure reducing valves 7-1 to 7-4 making it possible to inflate bladders 11, 12, 13 and 14 respectively at different pressures, thus providing the possibility of applying four different pressures to four parts of the body. These pressure reducing valves are connected to control units of the distribution module 5.

A control unit 5—5 controls pressure reducing valve 8 located on respirable gas input 19. This gas may preferably come from a bottle or from a device with a molecular sieve. The respirable gas is led to mask 15 through a piping 17 which is tightly connected to a deformable volume 10 wherein the respirable gas travels through deformable volume 10 from piping 17 to mask 15. Inside volume 10, a rigid piping having holes 18 prevents the collapse of the deformable volume. The bag forming the volume 10 is made up of a flexible and light impermeable fabric. Alternatively, two or several groups of bladders may be provided on the level of the trousers legs.

The operation of the device is as follows: the pilot, by means of handle 1, controls simultaneously the trajectory of his aircraft and the associated anti-g protection. The displacements of the handle are transformed into electric signals by sensor 2, then integrated by integrator 3. This signal is then compared to the aircraft parameters: speed, altitude, position of ailerons, control surfaces, and the like, stored in calculator 4, thus eliminating all information coming from the handle which is not related to acceleration. This signal is then processed in processing and distribution module 5 which creates a purified signal specific to each bladder by taking into account the position of the bladder compared to the pilot's heart oriented in the aircraft and the pressure to be generated specifically to each bladder.

The signal which comes from the flight control is modulated by another electric signal which comes from the function generating calculator before being sent to the pressure reducing valve.

Then, module 5 transmits n signals, specific to each pressure reducing valve, according to the real acceleration of the aircraft. Module 5 receives, from a function generating calculator 6, a signal whose size is determined according to the part of the body to which it is applied, to its position compared to the heart and to the applicable increase of pressure. The bladder whose pressure is controlled by module 5 is inflated with constraint gas by pressure reducing valves 7.

The objective is to obtain a law of inflation specific to each bladder according to the parts of the body to be protected so that the derivative of the continuous increasing function specific to each bladder decreases as the bladders are located more and more close to the heart. Then, a discontinuous gradient of pressures supporting the return of blood to the heart is achieved and the effect of punch is avoided. Ideally, the result would be a pressure continuous gradient, but the experiment shows that a pilot in an aircraft requires four levels of pressure, two of them on the trousers level (low, high) and two of them on the jacket level (handle, chest) to obtain a good improvement of the pilot comfort.

The sequences and the inflation pressures are such that the value of the pressure produced by the pressure reducing valve 7-2 controlling the bladder inflation, inside which is located deformable volume 10, is always equal to the value of the pressure produced by pressure reducing valve 8 which controls the respirable gas input to mask 15. This quality ensures the balance of the internal and external pressures on the pilot's thorax. Deformable volume 10 ensures the regulation of this balance. Indeed, as a result of holes 18, volume 10 is at the same pressure as mask 15. This pressure is higher than the pressure in bladder 11 causing an increase of volume 10 and thus a reduction of pressure until the balance is reached. Similarly, a depression would be compensated by a reduction in volume 10. The variations of thoracic volume, due in particular to the pilot's breathing, is then compensated.

While advantageous embodiments have been chosen to illustrate the invention, it will be understood by those skilled in the art that various changes and modifications can be made therein without departing from the scope of the invention as defined in the appended claims.

I claim:

1. A device providing physiological protection of aircraft pilots against effects of altitude and accelerations, comprising:
    a source of oxygen;
    a chest jacket comprising at least one inflation bladder connected by a piping to a first pressure reducing valve connected to a source of gas under pressure, said bladder including an element having a deformable volume;
    an oxygen mask connected to said source of oxygen by a conduit and a second pressure reducing valve, said element being disposed between said second pressure reducing valve and said oxygen mask to ensure regulation of the balance between the internal and external pressure on the pilot's thorax;
    anti-g trousers comprising at least one inflation bladder connected to a third pressure reducing valve, said third pressure reducing valve being connected to a source of gas under pressure;
    a detector including means for detecting accelerations and means for determining a signal corresponding to acceleration of the aircraft; and,
    control means for controlling said pressure reducing valves based on said signal determined by said detector.

2. A device according to claim 1, wherein the values of output pressure of the second and third pressure reducing valves are calculated starting from a continuous increasing function of the signal corresponding to acceleration of the aircraft, having a derivative proportional to the distance from the pilot's heart to each of said bladders, taking into account the position of the pilot in the aircraft compared to the acceleration.

3. A device according to claim 1, wherein the detector comprises a sensor means for transforming displacements of an aircraft control handle into electric quantity; an integrator means for transforming the electric quantity into a control signal; a signal calculator means for receiving the control signal and a parameter quantity representative of a combination of aircraft speed compared to air, altitude, the position of the aircraft ailerons and control surface, and means for determining, from the electric quantity and the parameter quantity, a signal representative of aircraft acceleration acting on the pilot, according to the longitudinal axis of the body of the pilot.

4. A device according to claim 1, wherein the element having a deformable volume comprises a flexible and light fabric crossed by the conduit, the conduit having a perforated rigid part located inside the element between the first pressure reducing valve and the mask.

5. A device according to claim 1, wherein the chest jacket and anti-g trousers comprise a single piece, and cover all the parts of a pilot's body, except the neck and head.

6. A device providing physiological protection of aircraft pilots against effects of altitude and accelerations, comprising:
    a source of oxygen;
    a plurality of first pressure reducing valves;
    a second pressure reducing valve;
    a plurality of third pressure reducing valves;
    a source of gas under pressure;

said chest jacket comprising at least one inflation bladder connected by pipings to a plurality of first pressure reducing valves;

an oxygen mask connected to said source of oxygen by a conduit and connected to said second pressure reducing valve;

anti-g trousers comprising inflation bladders connected to said plurality of third pressure reducing valves connected to said source of gas under pressure; and a detector including means for detecting accelerations of the aircraft and means for determining a signal corresponding to acceleration of the aircraft; and control means for controlling output pressure values of said third pressure reducing valves based on a continuous increasing function of said signal corresponding to acceleration of the aircraft and whose derivative decreases proportionally to the distance from the pilot's heart to each bladder of said anti-g trousers inflated by each of said third pressure reducing valves.

7. A device according to claim 6, wherein said control means further controls said third pressure reducing valves based on the continuous increasing function further corresponding to the position of aircraft ailerons and control surfaces and altitude of the control surfaces.

8. A device according to claim 6, wherein said control means comprises a plurality of control units, each of said first, second and third pressure reducing valves being controlled by one of said control units, said control units delivering a signal representative of the acceleration, said signal being modulated by a calculator means for generating the continuous increasing function within the respective control unit, to progressively open each of said pressure reducing valves.

9. A device according to claim 6, wherein the gas under pressure is a sampling on the level on one stage of a compressor of an aircraft engine.

10. A device according to claim 6, wherein the pressure reducing valves are controlled by said control means in sequence by control a plurality of control units.

11. A device according to claim 6, wherein said control means controls values of output pressure of the second and third pressure reducing valves based on a continuous increasing function of the signal corresponding to acceleration of the aircraft, having a derivative proportional to the distance from the pilot's heart to each of said bladders, taking into account the position of the pilot in the aircraft compared to the acceleration.

12. A device according to claim 6, wherein the detector comprises a sensor means for transforming displacements of an aircraft control handle into electric quantity; an integrator means for transforming the electric quantity into a control signal and a parameter quantity representative of a combination of aircraft speed compared to air, altitude, the position of the aircraft ailerons and control surface, and means for determining, from the electric quantity and the parameter quantity, a signal representative of aircraft acceleration acting on the pilot, according to the longitudinal axis of the body of the pilot.

13. A device according to claim 6, wherein the chest jacket and anti-g trousers comprise a single piece, and are adapted to cover all the parts of the pilot's body, except the neck and head.

* * * * *